(12) United States Patent
Holmstead et al.

(10) Patent No.: US 7,890,639 B1
(45) Date of Patent: Feb. 15, 2011

(54) METHOD AND APPARATUS FOR CONTROLLING ACCESS TO PORTAL CONTENT FROM OUTSIDE THE PORTAL

(75) Inventors: Shawn Matthew Holmstead, Lehi, UT (US); Olin Sayre Atkinson, Orem, UT (US); Dale Allen Lowry, Springville, UT (US); Christopher Jean Seiler, Pleasant Grove, UT (US)

(73) Assignee: Novell, Inc., Provo, UT (US)

( * ) Notice: Subject to any disclaimer, the term of this patent is extended or adjusted under 35 U.S.C. 154(b) by 1077 days.

(21) Appl. No.: 10/119,784

(22) Filed: Apr. 9, 2002

Related U.S. Application Data

(63) Continuation-in-part of application No. 10/066,465, filed on Jan. 30, 2002.

(51) Int. Cl.
*G06F 15/16* (2006.01)
(52) U.S. Cl. ...................................................... 709/229
(58) Field of Classification Search .................. 709/225, 709/229, 203–207
See application file for complete search history.

(56) References Cited

U.S. PATENT DOCUMENTS

| | | | |
|---|---|---|---|
| 5,603,034 A * | 2/1997 | Swanson | 717/111 |
| 5,717,923 A | 2/1998 | Dedrick | |
| 5,778,380 A | 7/1998 | Siefert | |
| 5,797,128 A | 8/1998 | Birnbaum | |
| 5,983,227 A | 11/1999 | Nazem et al. | |
| 6,029,245 A | 2/2000 | Scanlan | |
| 6,061,684 A | 5/2000 | Glasser et al. | |
| 6,119,078 A | 9/2000 | Kobayakawa et al. | |
| 6,202,066 B1 | 3/2001 | Barkley et al. | |
| 6,209,036 B1 | 3/2001 | Aldred et al. | |
| 6,209,124 B1 | 3/2001 | Vermeire et al. | |
| 6,240,170 B1 | 5/2001 | Shaffer et al. | |
| 6,243,717 B1 | 6/2001 | Gordon et al. | |
| 6,285,978 B1 | 9/2001 | Bernth et al. | |

(Continued)

FOREIGN PATENT DOCUMENTS

| EP | 0975128 | 1/2000 |
|---|---|---|

(Continued)

OTHER PUBLICATIONS

Yahoo! PortalBuilderTM, Portal Building Guide, Software Release 3.5.0, Nov. 2001.

(Continued)

*Primary Examiner*—Asad M Nawaz
*Assistant Examiner*—Sargon N Nano
(74) *Attorney, Agent, or Firm*—Marger Johnson & McCollom, P.C.

(57) ABSTRACT

To display content controlled by a portal outside of the portal itself, a user is authenticated to the portal and then permission to access the content authorized. After authentication and authorization, the requested content is returned to the requesting program. The content is returned in the user's preferred language, a using a layout information file to determine how to display the content. A layout strings file storing a layout string in a specific language is also selected, according to the user's preferred languages. The content from a content provider and the layout string are then formatted as specified by the layout information file, and presented to the user or the requesting program.

20 Claims, 15 Drawing Sheets

U.S. PATENT DOCUMENTS

| | | |
|---|---|---|
| 6,286,001 B1 | 9/2001 | Walker et al. |
| 6,311,180 B1 | 10/2001 | Fogarty |
| 6,327,628 B1 | 12/2001 | Anuff et al. |
| 6,363,337 B1 | 3/2002 | Amith |
| 6,370,498 B1 * | 4/2002 | Flores et al. ............... 704/3 |
| 6,381,579 B1 * | 4/2002 | Gervais et al. ............. 705/8 |
| 6,389,589 B1 * | 5/2002 | Mishra et al. ............ 717/170 |
| 6,408,336 B1 * | 6/2002 | Schneider et al. ........ 709/229 |
| 6,415,250 B1 | 7/2002 | van den Akker |
| 6,499,030 B1 | 12/2002 | Igata |
| 6,529,910 B1 | 3/2003 | Fleskes |
| 6,542,884 B1 | 4/2003 | Soderberg et al. |
| 6,557,005 B1 | 4/2003 | Burget |
| 6,560,639 B1 | 5/2003 | Dan et al. |
| 6,571,241 B1 | 5/2003 | Nosohara |
| 6,623,529 B1 | 9/2003 | Lakritz |
| 6,633,742 B1 | 10/2003 | Turner et al. |
| 6,644,322 B2 * | 11/2003 | Webb ..................... 128/899 |
| 6,704,024 B2 | 3/2004 | Robotham et al. |
| 6,708,172 B1 * | 3/2004 | Wong et al. ............... 707/10 |
| 6,738,950 B1 | 5/2004 | Barnett |
| 6,772,146 B2 | 8/2004 | Khemlani et al. |
| 6,784,883 B1 | 8/2004 | Allor |
| 6,785,728 B1 * | 8/2004 | Schneider et al. ........ 709/229 |
| 6,785,866 B1 | 8/2004 | Lewis et al. |
| 6,789,231 B1 | 9/2004 | Reynar et al. |
| 6,826,594 B1 | 11/2004 | Pettersen |
| 6,871,197 B1 | 3/2005 | Johnson |
| 6,901,367 B1 | 5/2005 | Berstis et al. |
| 6,925,595 B1 | 8/2005 | Whitledge et al. |
| 6,925,598 B2 | 8/2005 | Melhem et al. |
| 6,941,512 B2 | 9/2005 | Cheng |
| 6,965,914 B2 | 11/2005 | Dowling |
| 6,975,619 B1 | 12/2005 | Byers et al. |
| 6,993,554 B2 | 1/2006 | O'Donnell |
| 7,016,977 B1 | 3/2006 | Dunsmoir et al. |
| 7,085,834 B2 | 8/2006 | Delany et al. |
| 7,093,198 B1 * | 8/2006 | Paatero et al. ............ 715/746 |
| 7,111,242 B1 | 9/2006 | Grooters |
| 7,149,960 B1 | 12/2006 | Brooks et al. |
| 7,149,964 B1 | 12/2006 | Cottrille et al. |
| 7,194,524 B2 * | 3/2007 | Suzuki et al. ............. 709/219 |
| 7,284,239 B1 * | 10/2007 | Young et al. ............. 717/137 |
| 7,660,843 B1 * | 2/2010 | Atkinson et al. .......... 709/203 |
| 2001/0037192 A1 | 11/2001 | Shimamoto et al. |
| 2002/0002557 A1 | 1/2002 | Straube et al. |
| 2002/0007330 A1 | 1/2002 | Kumar et al. |
| 2002/0019839 A1 | 2/2002 | Shiu |
| 2002/0046245 A1 | 4/2002 | Hillar et al. |
| 2002/0052954 A1 | 5/2002 | Polizzi et al. |
| 2002/0055989 A1 | 5/2002 | Stringer-Calvert et al. |
| 2002/0069081 A1 | 6/2002 | Ingram et al. |
| 2002/0078253 A1 | 6/2002 | Szondy et al. |
| 2002/0103778 A1 | 8/2002 | Saxena |
| 2002/0120538 A1 * | 8/2002 | Corrie et al. ............. 705/35 |
| 2002/0123879 A1 | 9/2002 | Spector |
| 2002/0129001 A1 | 9/2002 | Levkoff et al. |
| 2002/0129052 A1 | 9/2002 | Glazer et al. |
| 2002/0138331 A1 * | 9/2002 | Hosea et al. ................ 705/10 |
| 2002/0143821 A1 | 10/2002 | Jakubowski |
| 2002/0147790 A1 * | 10/2002 | Snow ....................... 709/217 |
| 2002/0147801 A1 * | 10/2002 | Gullotta et al. ............ 709/223 |
| 2002/0149601 A1 | 10/2002 | Rajarajan et al. |
| 2002/0156902 A1 | 10/2002 | Crandall |
| 2002/0174150 A1 * | 11/2002 | Dang et al. ............... 707/536 |
| 2002/0174196 A1 | 11/2002 | Donohoe et al. |
| 2002/0184321 A1 | 12/2002 | Fishman et al. |
| 2002/0198971 A1 | 12/2002 | Resnick et al. |
| 2003/0005002 A1 * | 1/2003 | Chen et al. ................. 707/515 |
| 2003/0005159 A1 * | 1/2003 | Kumhyr .................... 709/246 |
| 2003/0020749 A1 | 1/2003 | Abu-Hakima et al. |
| 2003/0050986 A1 | 3/2003 | Matthews et al. |
| 2003/0061216 A1 * | 3/2003 | Moses ......................... 707/9 |
| 2003/0105771 A1 | 6/2003 | Tiefenbrun et al. |
| 2003/0110272 A1 | 6/2003 | du Castel et al. |
| 2003/0158897 A1 | 8/2003 | Ben-Natan et al. |
| 2003/0163517 A1 | 8/2003 | Assaf et al. |
| 2003/0191817 A1 | 10/2003 | Fidler |
| 2003/0195923 A1 * | 10/2003 | Bloch et al. ............... 709/203 |
| 2004/0034613 A1 | 2/2004 | Purvis et al. |
| 2004/0093376 A1 * | 5/2004 | De Boor et al. ............ 709/203 |
| 2004/0098406 A1 | 5/2004 | Roddy |
| 2004/0123238 A1 | 6/2004 | Hefetz et al. |
| 2004/0172389 A1 * | 9/2004 | Galai et al. ................... 707/3 |
| 2004/0177015 A1 * | 9/2004 | Galai et al. ................. 705/35 |
| 2004/0193699 A1 | 9/2004 | Heymann et al. |
| 2004/0199603 A1 | 10/2004 | Tafla et al. |
| 2004/0205118 A1 * | 10/2004 | Yu .............................. 709/203 |
| 2004/0205553 A1 * | 10/2004 | Hall et al. .................. 715/513 |
| 2004/0205572 A1 * | 10/2004 | Fields et al. ............... 715/513 |
| 2004/0215740 A1 * | 10/2004 | Frank et al. ................ 709/217 |
| 2005/0055630 A1 | 3/2005 | Scanlan |
| 2005/0060046 A1 | 3/2005 | Ito et al. |
| 2005/0097008 A1 * | 5/2005 | Ehring et al. ................ 705/26 |
| 2005/0097190 A1 * | 5/2005 | Abdelhak ................... 709/217 |
| 2005/0188318 A1 | 8/2005 | Tamir et al. |
| 2006/0004763 A1 * | 1/2006 | Horvitz et al. ................ 707/9 |
| 2006/0010390 A1 | 1/2006 | Guido et al. |
| 2006/0101332 A1 | 5/2006 | Imielinski et al. |
| 2007/0180432 A1 * | 8/2007 | Gassner et al. ............. 717/136 |
| 2008/0300863 A1 | 12/2008 | Smith |

FOREIGN PATENT DOCUMENTS

| | | |
|---|---|---|
| WO | 9820434 | 5/1998 |

OTHER PUBLICATIONS

"Systran Enterprise Products Page", Systran; 2004; pp. 1-3.

Blount Sumner; "Secure Portal Management", eAI Journal; May 2000; pp. 44, 46, 48 and 49.

King, Bob; "All Together Now"; Internet World; Aug. 15, 2000; pp. 38-39.

Wugofski; "CSS Mobile Profile 1.0"; W3C; Oct. 24, 2000; pp. 1-15.

* cited by examiner

METHOD AND APPARATUS FOR CONTROLLING ACCESS TO PORTAL CONTENT FROM OUTSIDE THE PORTAL

RELATED APPLICATION DATA

This application is a continuation-in-part of U.S. patent application Ser. No. 10/066,465, titled "Method and Apparatus to Dynamically Provide Web Content Resources in an Internet Portal," filed Jan. 30, 2002, and is related to U.S. patent application Ser. No. 10/066,368, titled "Method to Dynamically Determine a User's Language for the Internet," filed Jan. 30, 2002, both of which are hereby incorporated by reference.

FIELD OF THE INVENTION

This invention pertains to network access, and more particularly to accessing content over a network preferred by the user.

BACKGROUND OF THE INVENTION

U.S. patent application Ser. No. 10/066,465, titled "Method and Apparatus to Dynamically Provide Web Content Resources in an Internet Portal," filed Jan. 30, 2002, and related U.S. patent application Ser. No. 10/066,368, titled "Method to Dynamically Determine a User's Language for the Internet," filed Jan. 30, 2002, describe methods and apparatus for accessing content by a user in a preferred format. The systems of these patent applications for the most part provide indirect access to the content. The user does not directly access the content. Instead, the user access is via portal sites, which act as intermediaries between the user and the content, the types of content the user prefers. The portal site accesses the content, structures it for display to the user, and then presents the information to the user in a particular way.

In addition, these patent applications do not address the question of security. Instead, these patent applications assume that the user has already been authenticated or "checked out" by the portal site and has permission to view the content.

Sometimes, however, a user will want to access content without going through presentation of the information in a particular way coming from portal site. Unless the user has a mechanism to directly access the content, this is not possible, and limits the user's ability to use the content.

Accordingly, a need remains for a way to provide a user with access to secure content without having to go through the presentation of information in a particular way from a portal site, to address these and other problems associated with the prior art.

SUMMARY OF THE INVENTION

An embodiment of the invention is a method and apparatus for securely accessing content by a user. The user is authenticated and permission to access the content is authorized. The request to access the content is then granted.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
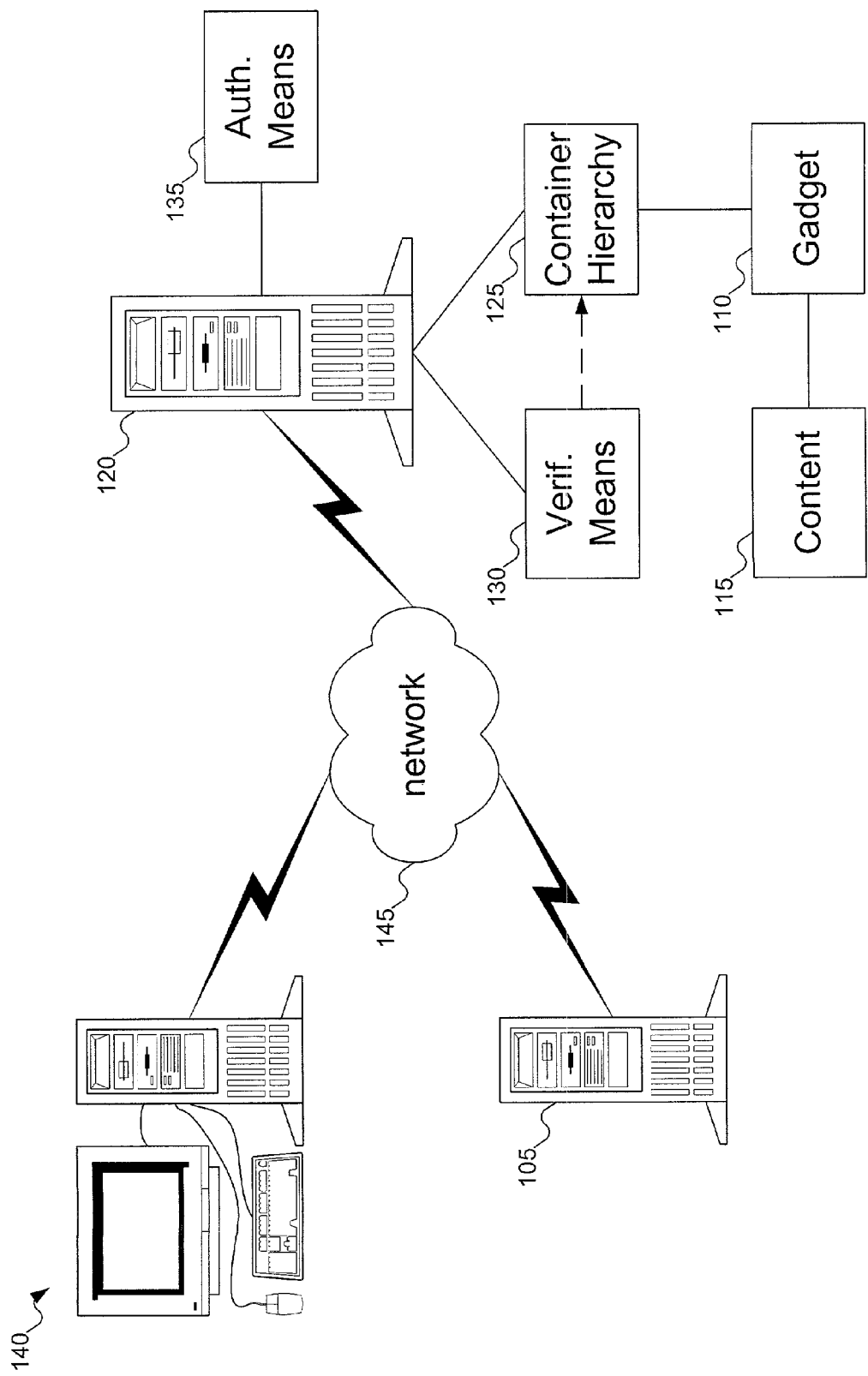
FIG. 1 shows a client requesting access to content from a server according to an embodiment of the invention.

FIG. 1 shows a client requesting access to content from a server according to an embodiment of the invention. In FIG. 1, server 105 does not contain gadget 110 or content 115. Connected to server 105 is portal server 120, which stores gadget 110 and content 115 in container hierarchy 125. Portal server 120 also includes verification means 130, which determines if the user is authorized to access content 115. Portal server 120 can also include authentication means 135 to authenticate a user before determining whether a user is authorized to access the content. But a person skilled in the art will recognize that authentication and authorization are separate from the content and distinct from each other. Authentication means 135 can be installed on an authentication server (not shown in FIG. 1) separate from either server 105 or portal server 120. Similarly, verification means 130 can be installed on an authorization server (not shown in FIG. 1) separate from either server 105 or portal server 120.

The distinction between authorization and authentication might be unclear to some. Authentication is akin to identifying who wants to enter the building and deciding to let them in or not. Authorization is akin to an additional check once they are in the building deciding whether they are allowed in a particular room within the building. Clearly, if a user is not authenticated, he cannot be authorized to access any content portal server 120.

FIG. 1 also shows client 140 connecting to server 105 via network 145. Client 140 is shown as a computer, and can include all the typical components of a computer, such as keyboard, monitor, mouse, central processing unit, memory, etc. But a person skilled in the art will recognize that client 140 can be any type of device capable of accessing the content. For example, client 140 can be a personal digital assistant (PDA), a notebook computer, a wireless Internet access device, etc. Similarly, network 145 can be any type of network, including local area network (LAN), wide area network (WAN), wireless network, the Internet, etc.

Although FIG. 1 shows the content as being part of gadget 110, a person skilled in the art will recognize that portal server 120 can store content 115 directly, without the use of gadget 110. Similarly, a person skilled in the art will recognize that server 105 can include the functionality of portal server 120, and can store container hierarchy 125 (with gadget 110 and content 115), verification means 130, and authentication means 135.

A person skilled in the art will recognize that, although the above description talks about a user being authenticated and authorized to access the content, a user does not have to be a person. Instead, a user can be a portal site, or a spider scouring the web, or a search engine collecting data for users, or any other type of electronic entity. It is true that authentication is usually thought of in terms of a person providing an identification and password, and that is the typical form authentication can take for an embodiment of the invention, but any other variety of entity can access the content, provided the entity can be authenticated and authorized.

Figure 2:
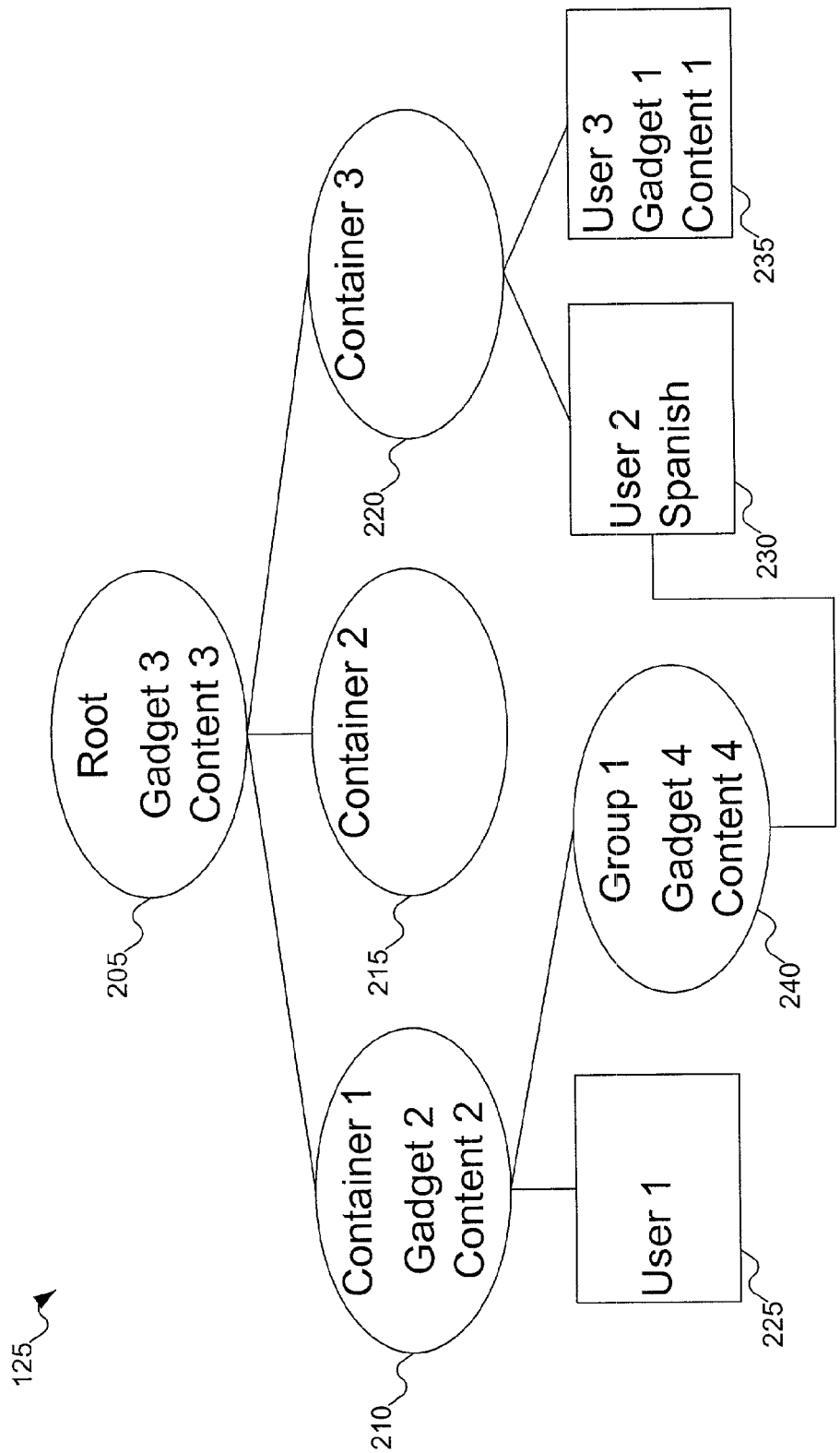
FIG. 2 shows details about the container hierarchy of FIG. 1, according to an embodiment of the invention.

FIG. 2 shows details about the container hierarchy of FIG. 1, according to an embodiment of the invention. Specifically, FIG. 2 shows the structure of container hierarchy 125 as used to store information about user accounts that can access content from server 105. In FIG. 2, root 205 is the root of a container hierarchy. There are three containers below root 205: container 1 (210), container 2 (215), and container 3 (220). Each of containers 1 (210), 2 (215), and 3 (220) represent a group of employees. The containers can be organized in any desired fashion and to any purpose. A person skilled in the art will recognize that there are numerous variations on FIG. 2. For example, there can be fewer or more than three containers below root 205.

Containers 1 (210) and 3 (220) are expanded, and show directory entries for three individuals. Directory entry 225 is for user 1, directory entry 230 is for user 2, and directory entry 235 is for user 3. Although FIG. 2 shows one user in container 1 (210) and two users in container 3 (220), a person skilled in the art will recognize that there can be more or fewer than three users in a container. In addition, a person skilled in the art will recognize that there can be more than three levels in container hierarchy 125 (i.e., any of containers 1 (210), 2 (215), or 3 (220) might have a container nested within).

User 3 (directory entry 235) specifies that user 3 is entitled to access content 1. Although only one content is listed in directory entry 235, a person skilled in the art will recognize that a directory entry can authorize a user to access more than one content. In contrast to user 3, users 1 and 2 (directory entries 225 and 230) do not specify that the users are permitted to access any content directly. But users 1 and 2 (directory entries 225 and 230), like all directory entries, inherit content authorizations from containers in which their directory entries are nested. For example, user 1 (directory entry 225) is nested in container 1 (210), which grants all users in container 1 (210) the authority to access content 2. Similarly, root 205 (which includes all containers and users in container hierarchy 125) specifies that all users within root 205 have the authority to access content 3. Thus, by way of inheritance, users 1 (directory entry 225), 2 (directory entry 230), and 3 (directory entry 235) all have rights to access content 3.

User 2 (directory entry 230) shows a slightly different situation. Directory entry 230 does not specify any content that user 2 is authorized to access, but it does list Spanish as a preferred language for user 2. As described in U.S. patent application Ser. No. 10/066,465, titled "Method and Apparatus to Dynamically Provide Web Content Resources in an Internet Portal," filed Jan. 30, 2002, the user's directory entry can be used to specify a preferred language in which content is displayed. The use of a preferred language is discussed further below with reference to FIGS. 3-5.

FIG. 2 also shows group 1 (directory entry 240), which represents a group of users not controlled by container hierarchy. Group 1 (directory entry 240) contains only one member, user 2 (directory entry 230), but a person skilled in the art will recognize that a group can have more than one member. Group 1 (directory entry 240) also contains access to content 4. All members of group 1 thereby gain access to content 4. Thus, user 2 (directory entry 230) has access to content 4, while user 1 (225) and user 3 (235) do not have access to content 4.

Although FIG. 2 shows a direct membership relationship between group 1 (directory entry 240) and user 2 (directory entry 230), a person skilled in the art will recognize that membership in a group can be direct membership or indirect membership based upon some criteria. The criteria can be anything, such as "users whose first names begin with the letter 130 A," or "users who are managers," for example. Whether group membership is direct or indirect does not affect the users' privileges to access content assigned to the group.

Figure 3:
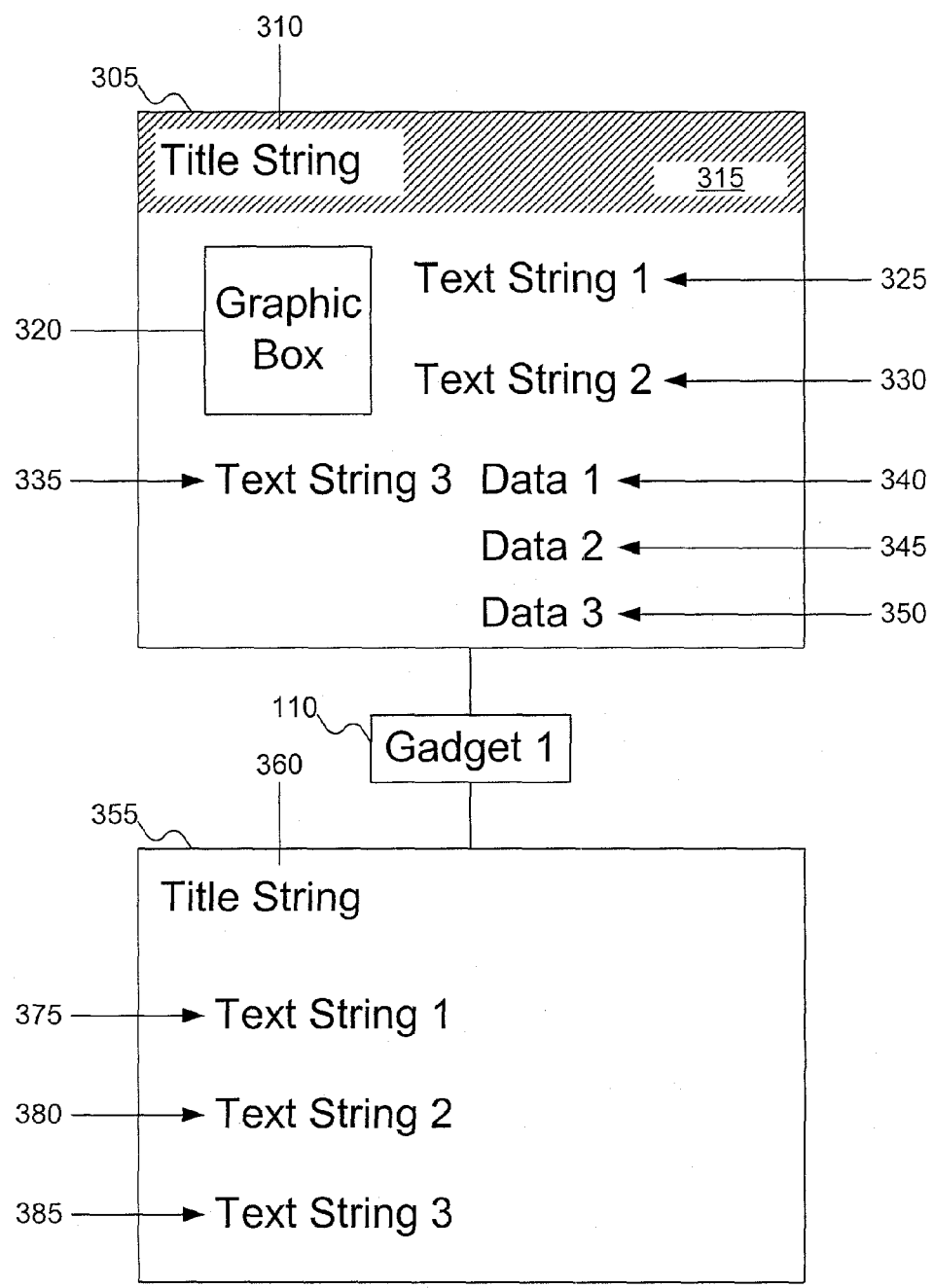
FIG. 3 shows one of the gadgets of FIG. 1 with two different layouts.

FIG. 3 shows one of the gadgets of FIG. 2 with two different layouts. In FIG. 3, layout information file (LIF) 305 specifies one layout for gadget 110, and LIF 355 specifies an alternative layout for gadget 110. (A layout information file is sometimes called a skin.) For example, LIF 305 might represent the default layout for gadget 110, whereas LIF 355 might represent a layout of gadget 110 for portable devices (where space is at a premium).

In layout information file 305, title string 310 provides a title for the gadget. For example, if gadget 110 is for Stocks, title string 310 can be "Portfolio," whereas if gadget 110 is for news, title string 310 can be "World News." Title string 310 is one example of a layout string (sometimes called a language string). Layout strings are strings that are displayed on the gadget that are language dependent. Rather than storing the string directly on the content page, LIF 305 stores a placeholder for a layout string, which can be pulled from a layout strings file for the specific language (see below with reference to FIG. 4 for more information). In that way, LIF 305 can be generally language-independent. Text strings 1 (325), 2 (330), and 3 (335) are additional examples of layout strings in LIF 305.

A person skilled in the art will recognize that there are times when LIFs can be language dependent. For example, some languages are displayed right-to-left (such as Hebrew, or Arabic). For these languages, a LIF that has the information displayed in a different presentation can be preferable.

Because content can be displayed in color, color stripe 315 can be behind title string 310. The color of color stripe 315 can be user-specified, or it can be specified by an administrator (in which case, the color is selected according to the same rules for all users).

Graphic box 320 enables the content provider to specify graphic images that are language-specific. For example, advertisements on content pages are typically stored as images, but include text. By enabling graphic images to be language-dependent and treating graphic box 320 as a layout string, the graphic images presented to the user can also be language-dependent. In addition, graphic images can be context-dependent, as symbols can be recognized by speakers of some languages but not other languages.

Data strings 1 (340), 2 (345), and 3 (350), in contrast to text strings 1 (325), 2 330, and 3 (335), are not layout strings. Instead, data strings 1 (340), 2 (345), and 3 (350) are data that can vary depending on the time the content is displayed, and are usually language independent. For example, if LIF 305 shows, in part, stock price information, data string 1 (340), 2 (345), and 3 (350) can show the values for the Dow Jones Industrial Average, the NASDAQ, and the S&P 400. Or data strings 1 (340), 2 (345), and 3 (350) can represent the values of three particular stocks of interest to the user. A person skilled in the art will recognize other information that can be displayed in data strings 1 (340), 2 (345), and 3 (350). The values for the data strings are provided by a content provider.

Although the data strings are described above as being generally language independent, a person skilled in the art will recognize that the data strings can be localized as well. For example, the fractional portion of a decimal number is separated from the whole portion of the number by a decimal point (".") in the United States. But in other countries, a comma (",") is used. The gadget that generates the data can take advantage of the selected language to localize the data accordingly. Nevertheless, such data is not stored in a layout strings file, as the data can vary with time much more readily than the text strings.

A person skilled in the art will recognize that LIF 305 is exemplary, and not a required format. Thus, there can be more or fewer than four layout strings, nor does there have to be a title string. Data does not have to be displayed, nor do graphic images. Data can be presented in any format desired by the content provider. In short, LIF 305 merely shows one possible layout information file, of which there are nearly infinite arrangements.

For example, LIF 355 shows an alternative layout information file. LIF 355 can be for a portable device, on which display area is at a premium. Thus, although LIF 355 includes title string 360 and text strings 1 (375), 2 (380), and 3 (385), color is not used to highlight title string 360, nor are data strings 1 (340), 2 (345), and 3 (350) provided for.

Figure 4:
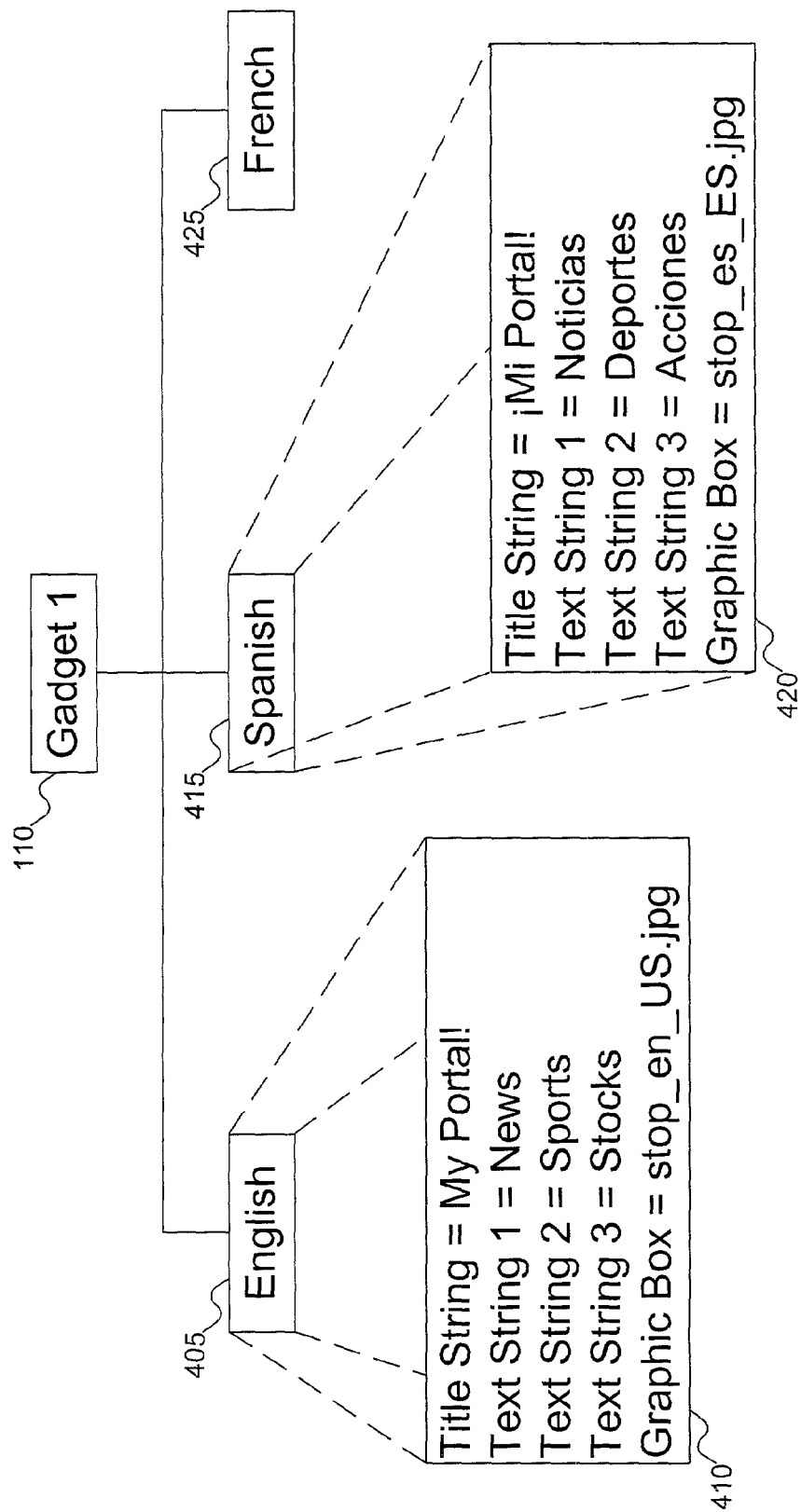
FIG. 4 shows the gadget of FIG. 3 with strings in two different languages.

FIG. 4 shows the gadget of FIG. 3 with strings in two different languages. In FIG. 4, English language 405 for gadget 110 is expanded as layout strings file 410. Layout strings file 410 shows substitution strings for the title string, text strings 1, 2, and 3, and a particular graphic image to use in a graphic box. Similarly, layout strings file 420 shows substitution strings for the title string, text strings 1, 2, and 3, and a particular graphic image to use in a graphic box for Spanish language 415. (French language 425 is not expanded for reasons of space in FIG. 4, but a person skilled in the art will recognize that similar strings in French can be placed in French language 425.)

Figure 5A:
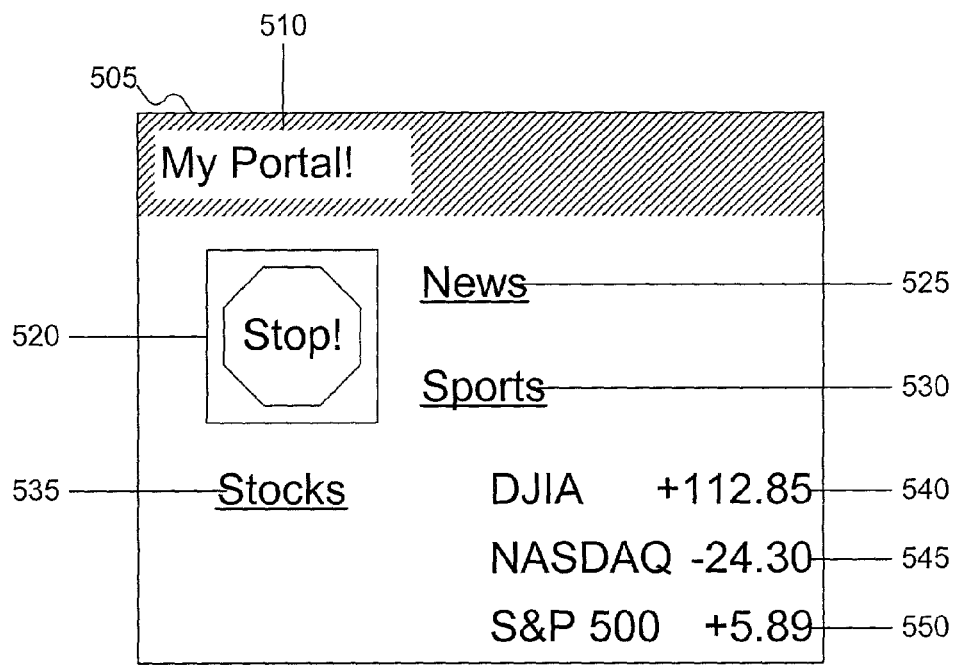
FIGS. 5A and 5B show the gadget of FIG. 3, the gadget combining one of the layouts of FIG. 4 with layout strings and images.
Figure 5B:
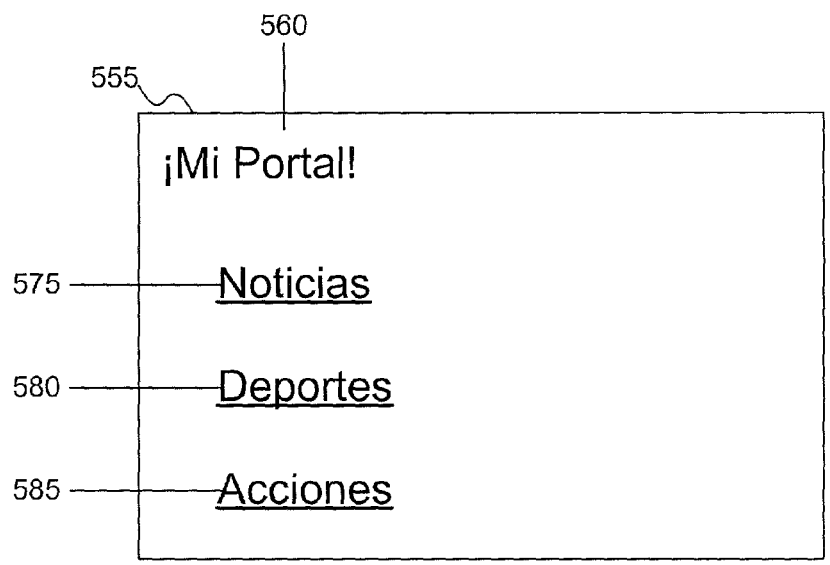

FIGS. 5A and 5B show the gadget of FIG. 3 combining one of the layouts of FIG. 3 with layout strings and images. In FIG. 5A, content page 505 shows a combination of layout 305 with English layout strings file 410. For example, title string 510 is "My Portal!", the English language title string from layout strings file 410. Similarly, text strings 525, 530, and 535 are the layout strings from expansion box 405 substituted into layout 305. And graphic image 520 is the graphic image specified in layout strings file 405.

Data strings 1 (540), 2 (545), and 3 (550) are substituted with the actual data to be displayed on the content page. As described above with reference to FIG. 3, data strings 1 (540), 2 (545), and 3 (550) are generally (but not always) independent of language. Their placement on the content page is determined by the LIF, but the data are not drawn from the layout strings files.

In contrast, FIG. 5B shows a content page generated by combining LIF 355 with Spanish layout strings file 420. Content page 555 shows the title string as "¡Mi Portal!", the Spanish language title string from layout strings file 420. Similarly, text strings 1 (575), 2 (580), and 3 (585) are drawn from layout strings file 420. Note that, although a Spanish graphic image is specified in layout strings file 420, no graphic is used in LIF 355, and so no graphic is displayed in FIG. 5B.

The content returned to the user is not the presentation of the content, as shown in FIGS. 5A and 5B, but rather files that allow the user to construct the image, if desired. For example, a HyperText Markup Language (HTML) file can be returned, so that the user can display the content on his device. Or an eXtensible Markup Language (XML) file can be returned, which the user can process as desired. Or the layout strings and data strings can be returned directly to the user, without further modification. A person skilled in the art will recognize other ways in which the content can be returned to the user.

Figure 6A:
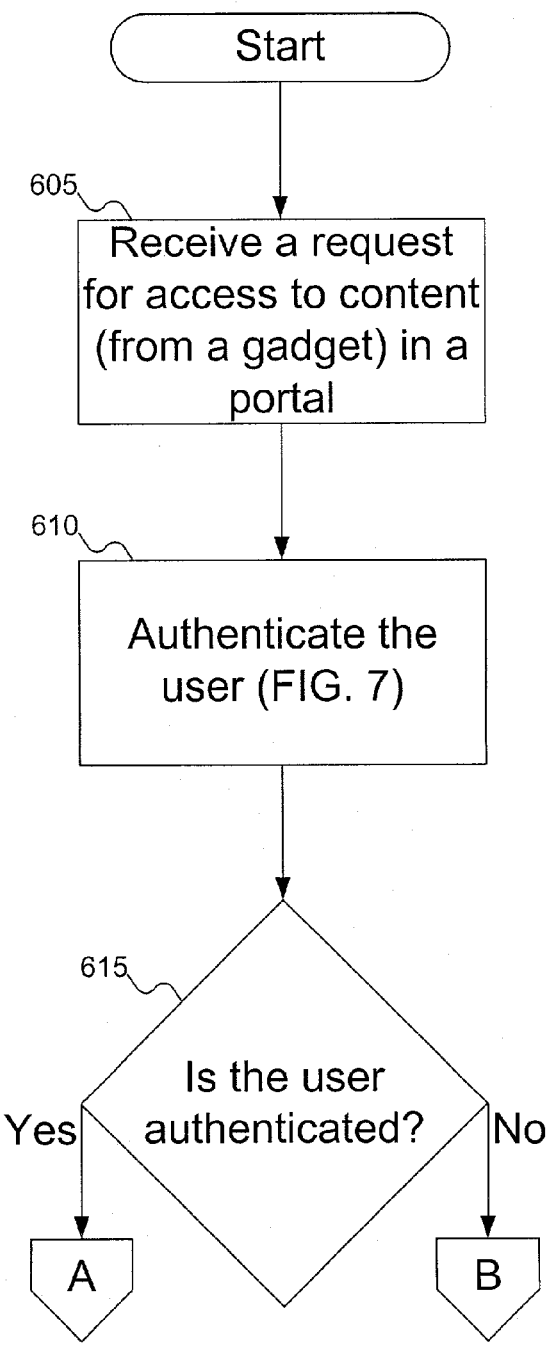
FIGS. 6A and 6B show a flowchart of the procedure for granting or denying a request for access to the content of FIG. 1, according to an embodiment of the invention.
Figure 6B:
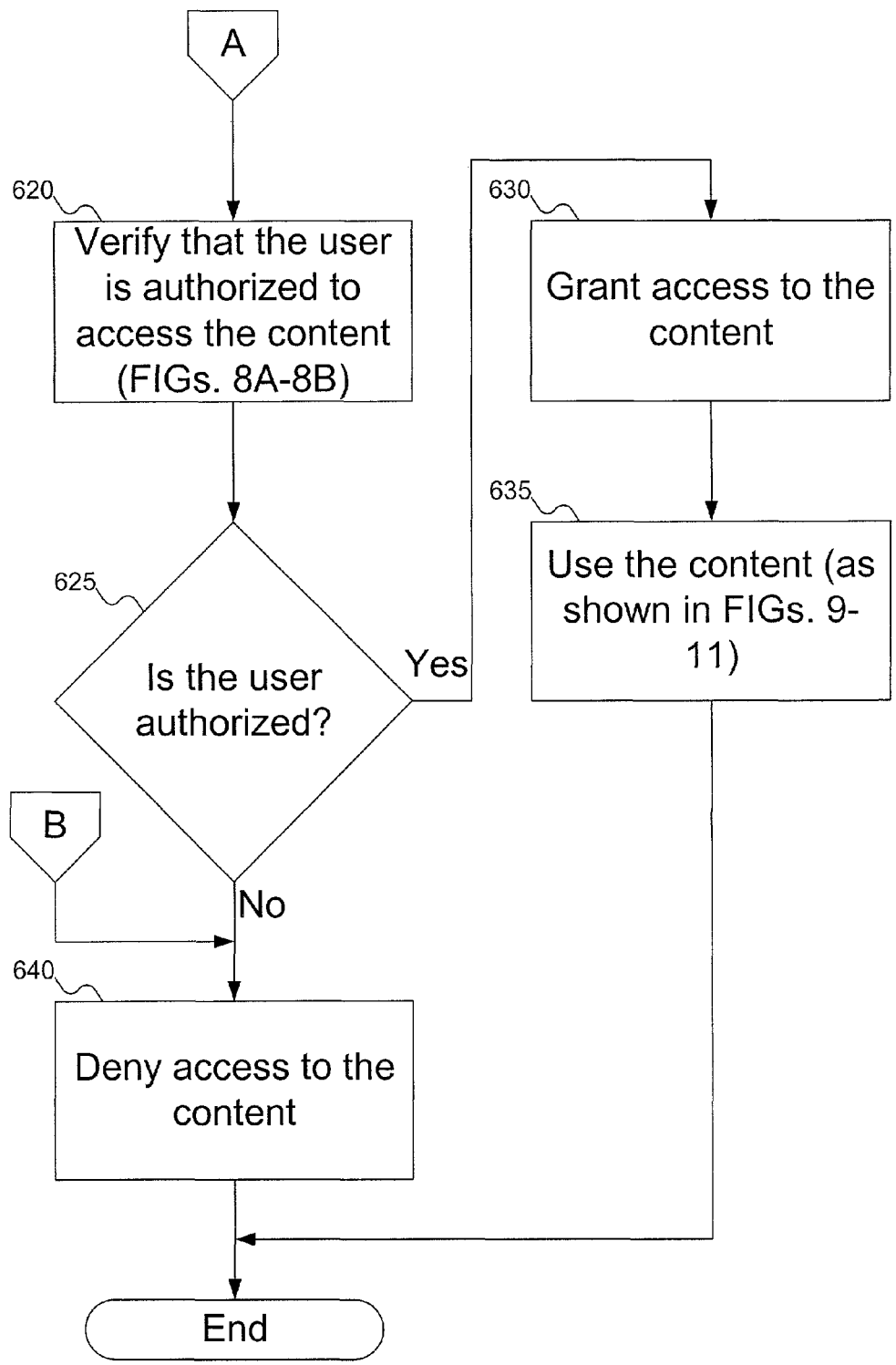

FIGS. 6A and 6B show a flowchart of the procedure for granting or denying a request for access to the content of FIG. 1, according to an embodiment of the invention. In FIG. 6A, at step 605, the portal server receives a request for content from a user. As described above, the content can be a gadget, or it can be content of any other type. In addition, the request for content can come directly from a user, or can come indirectly from a user via a second server. At step 610, the portal server authenticates the user, as described below with reference to FIG. 7. At step 615, the portal server determines whether the user was authenticated. If the user was authenticated, then at step 620 (see FIG. 6B), the portal server determines if the user is authorized to access the particular content desired, as described below with reference to FIGS. 8A-8B. At step 625, the portal server determines whether the user was authorized to access the content. If the user was authorized to access the content, then at step 630 the request to access the content is granted, and at step 635 the user uses the content, as described below with reference to FIGS. 9A-11. On the other hand, if the user either was not authorized to access the content or was not authenticated, then at step 640 the request to access the content is denied.

Figure 7:
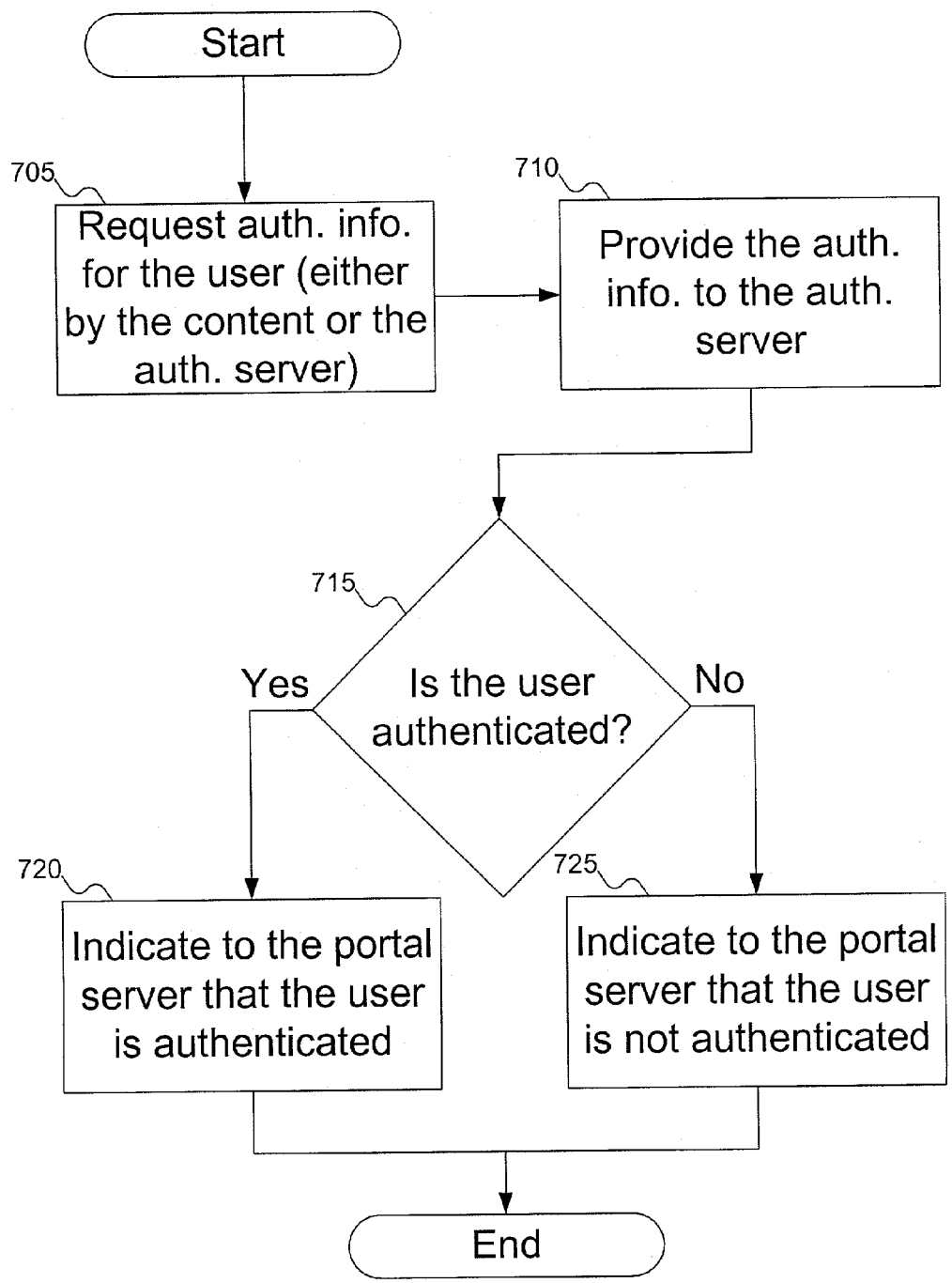
FIG. 7 shows a flowchart of the procedure for authenticating a user to grant access to the content of FIG. 1, according to an embodiment of the invention.

FIG. 7 shows a flowchart of the procedure for an authentication server to authenticate a user to grant access to the content of FIG. 1, according to an embodiment of the invention. In FIG. 7, at step 705, the authentication information is requested. The request can be made by the authorization server using a standard dialog box, or can be made by the content itself when the user enters the address of the content. At step 710, the authentication information is provided to the authorization server. (If the authentication information is requested by the content, the authentication information can be provided to the authorization server in several ways, such as in the address of the content.) At step 715, the authorization server determines if the user is authenticated. If the user is authenticated, then at step 720 the authorization server returns the valid authentication to portal server 120. Otherwise, at step 725 the authorization server indicates that the user is not authenticated (and that portal server 120 should deny the request for access to the content).

Although FIG. 7 is explained in terms of an authentication server separate from the portal server performing the authentication of the user, a person skilled in the art will recognize how FIG. 7 can be modified to enable the portal server to authenticate the user itself. For example, steps 720 and 725 would not be needed, since the portal server is the authentication server in this case.

Figure 8A:
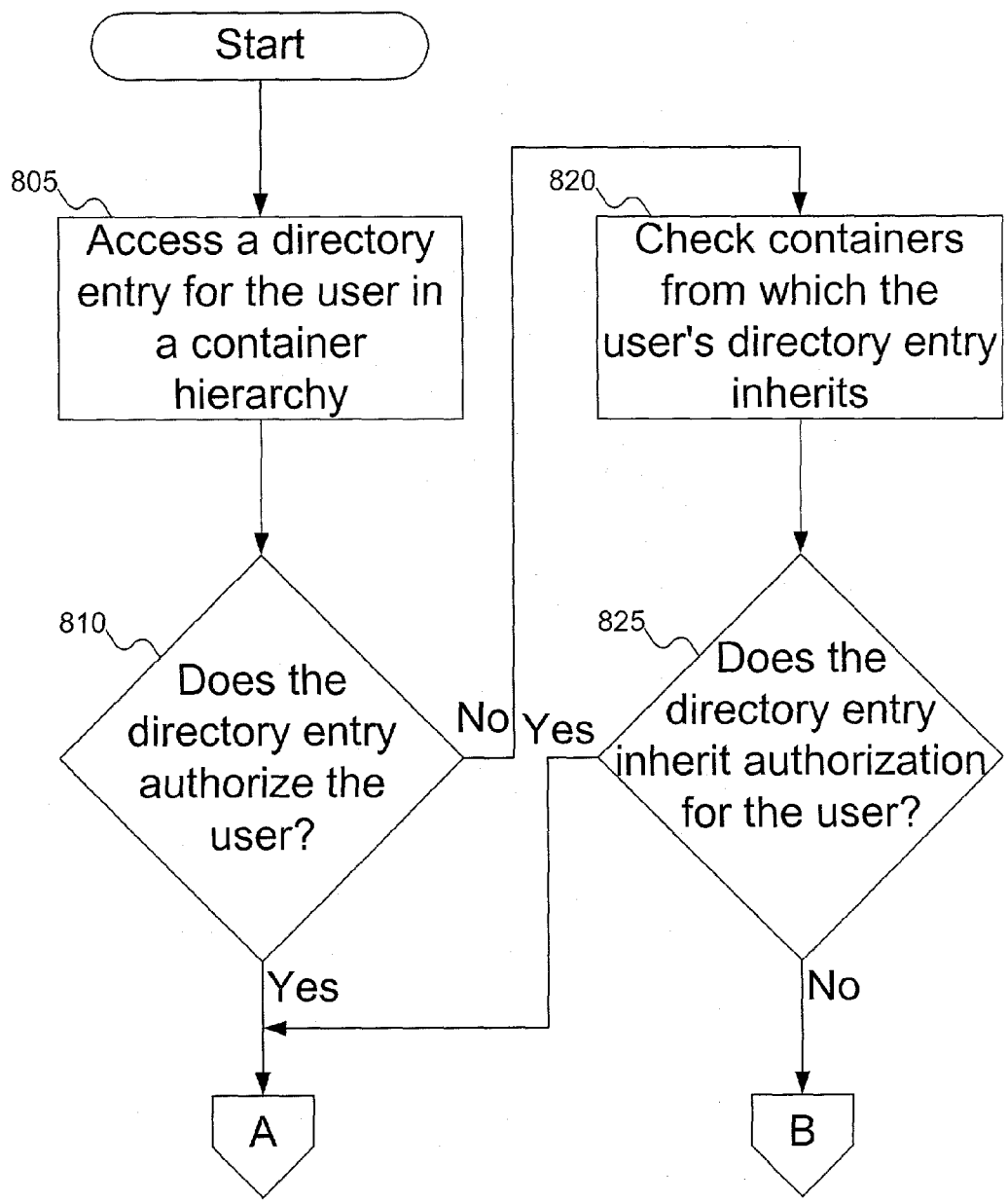
FIGS. 8A-8B show a flowchart of the procedure for authorizing a user to access the content of FIG. 1, according to an embodiment of the invention.
Figure 8B:
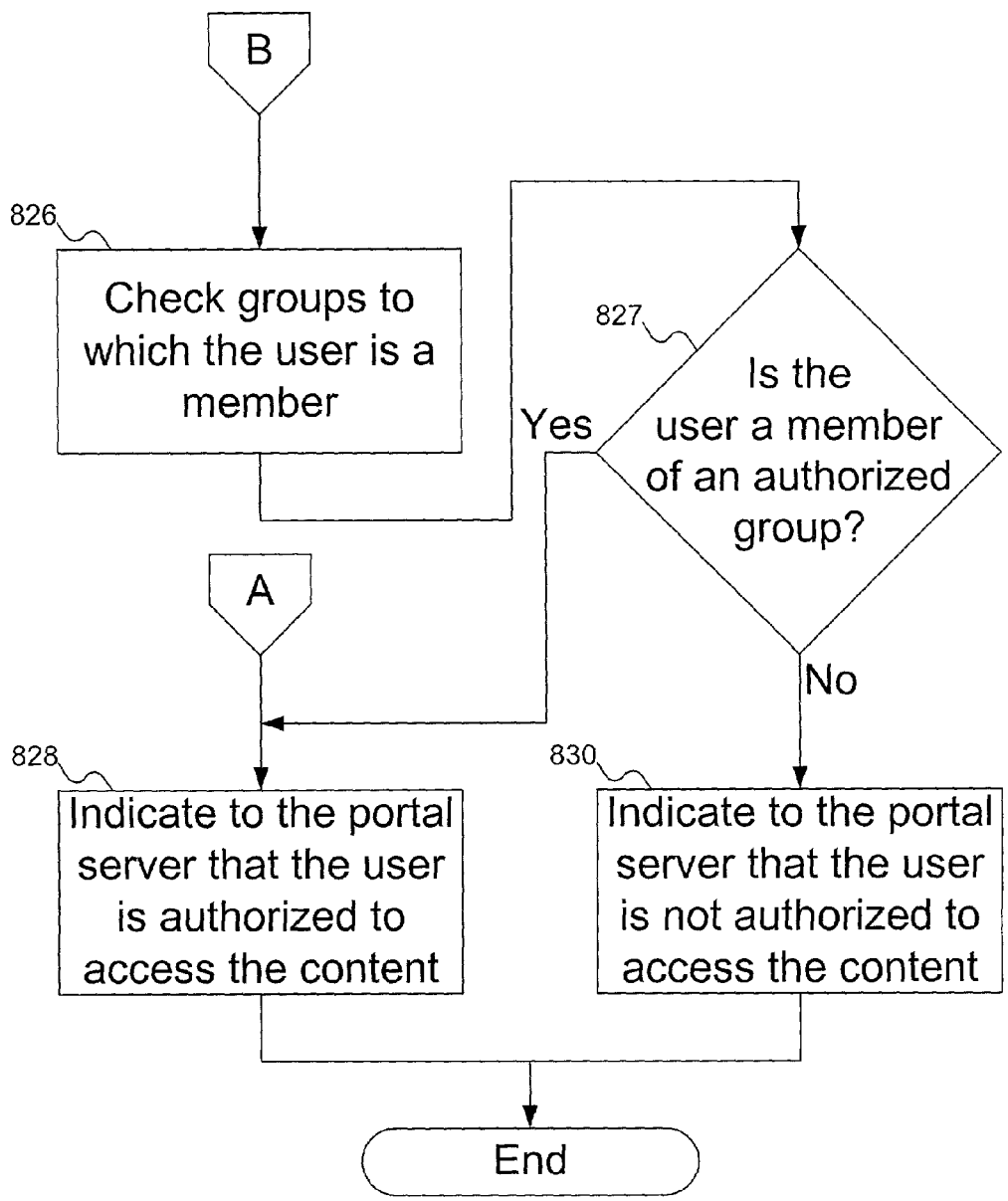

FIGS. 8A-8B show a flowchart of the procedure for an authorization server to authorize a user to access the content of FIG. 1, according to an embodiment of the invention. In FIG. 8A, at step 805, the authorization server accesses the user's directory entry in the container hierarchy. At step 810, the authorization server determines if the user's directory entry authorizes the user to access the content. If the user's directory entry does not indicate that the user is authorized to access the content, then at step 820 the authorization server checks the containers from which the user's directory entry can inherit, to see if the user inherits authorization to access the content. At step 825, the authorization server determines if the user inherits authorization to access the content. If the user does not inherit authorization to access the content, then at step 826 (FIG. 8B) the authorization server checks any groups of which the user is a member (directly or indirectly). At step 827, the authorization server determines if the user is a member of any group that is authorized to access the content. If the user's directory entry indicates that the user is authorized to access the content, or if the user inherits authorization to access the content, or if the user is a member of a group authorized to access the content, then at step 828 the authorization server indicates to the portal server that the user is authorized to access the content. Otherwise, at step 830 the authorization server indicates to the portal server that the user is not authorized to access the content.

As with FIG. 7, FIGS. 8A-8B are explained in terms of an authorization server separate from the portal server performing the authorization of the user. But a person skilled in the art will recognize how FIGS. 8A-8B can be modified to enable the portal server to authorize the user itself. For example, steps 828 and 830 would not be needed, since the portal server is the authorization server in this case.

Figure 9A:
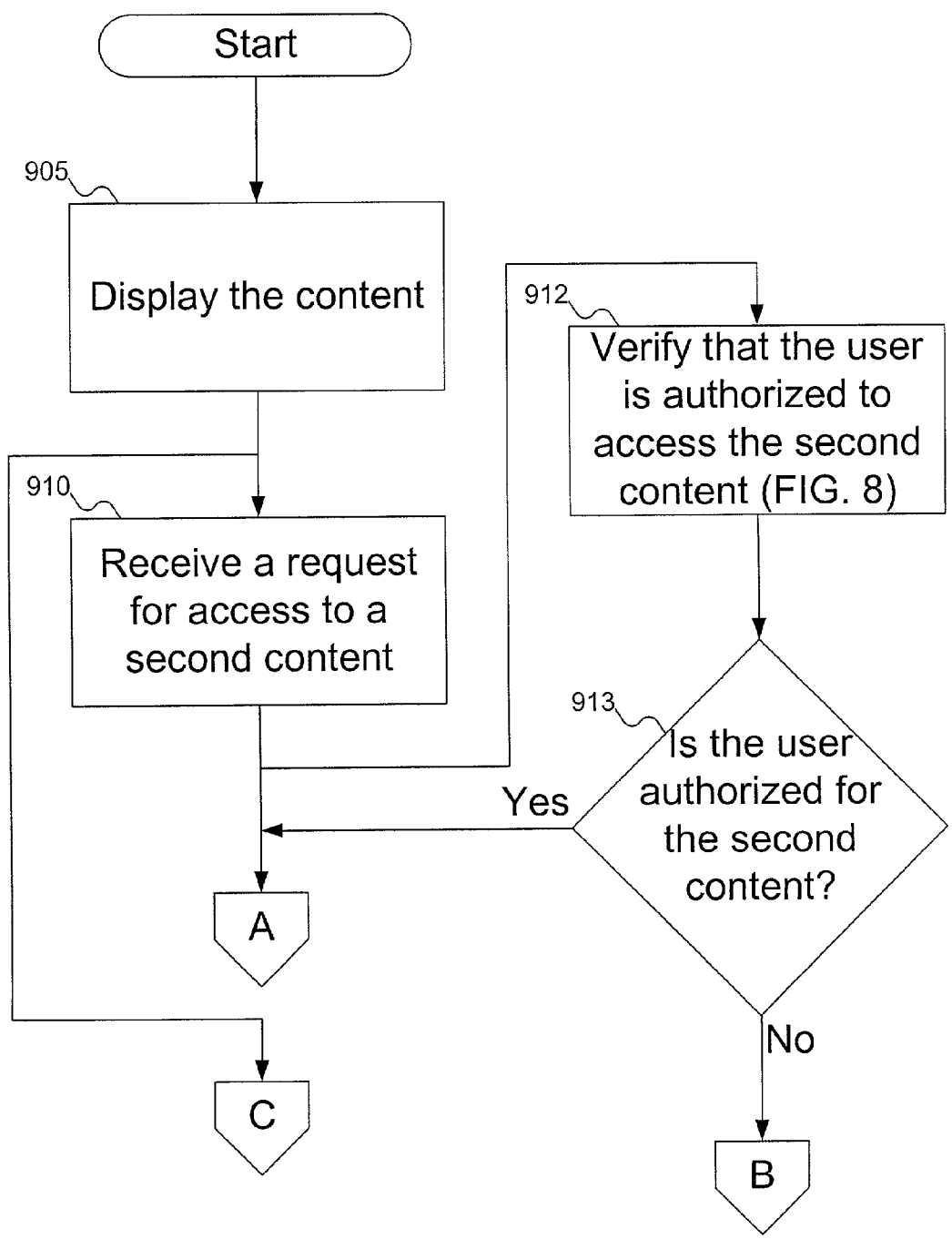
FIGS. 9A-11 show different ways the content of FIG. 1 can be used, once the user has been authenticated and authorized to access the content, according to an embodiment of the invention.
Figure 9B:
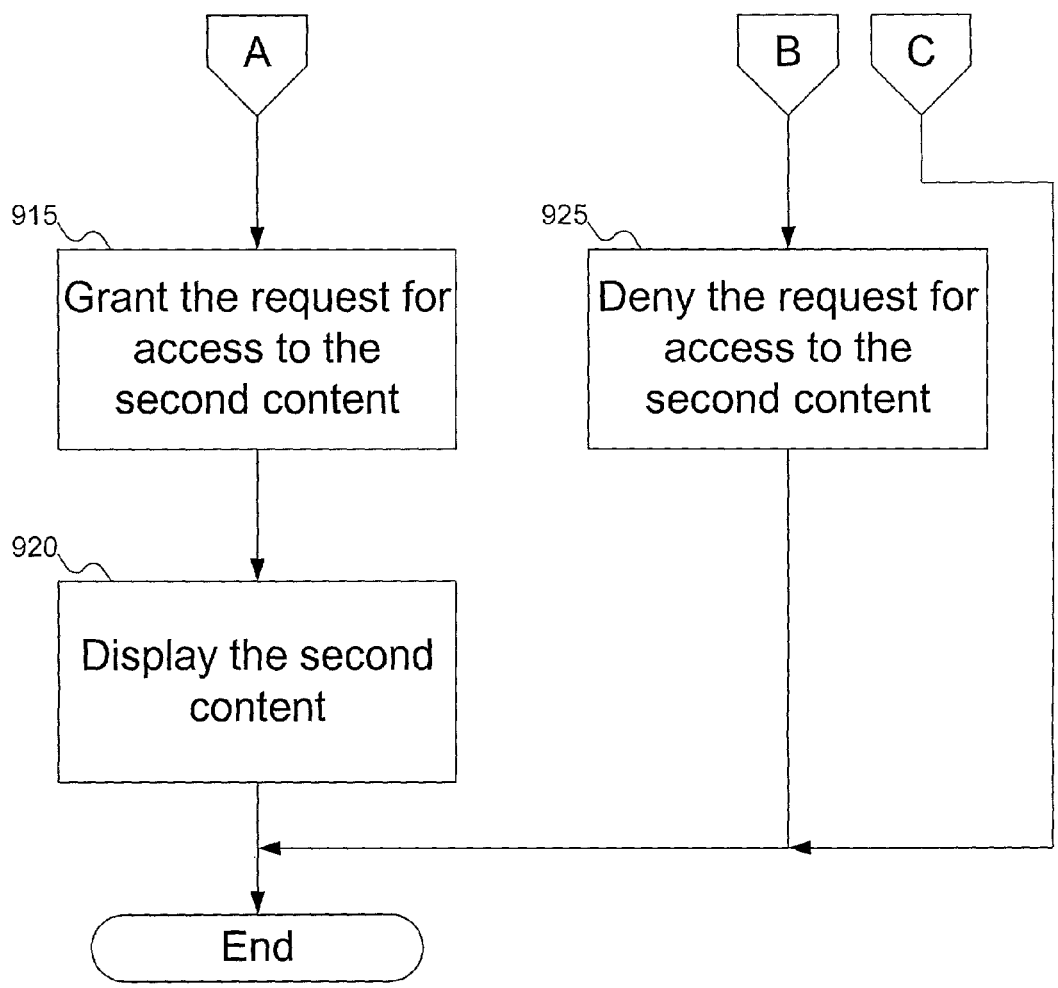

FIGS. 9A-11 show different ways the content of FIG. 1 can be used, once the user has been authenticated and authorized to access the content, according to an embodiment of the invention. FIGS. 9A-9B show a flowchart of the procedure for processing the request for content independently of any other content. In FIG. 9A, at step 905, the content is displayed to the user. Processing can then terminate. But if the server receives a second request for access to (a different) content on the server, as in step 910, the server does not need to authenticate, since the user has already been authenticated. At step 912, the server verifies that the user is authorized to access the new content, as described above with reference to FIG. 8. At step 913, the server determines whether the user was authorized to access the second content. If the user was authorized to access the second content, then at step 915 (FIG. 9B), the server grants the user access to the new content, and at step 920 the user displays the new content. Otherwise, at step 925, the server denies the request for access to the second content.

Note that the user is authorized separately for the second content. Although the user has been authorized for one content from the server, that single authorization does not imply that the user is authorized for the second content. But if being authorized for one content on the server entitles the user access to all content on the server, then the server can skip the authorization step as well as the authentication step after receiving the second request for content.

Figure 10A:
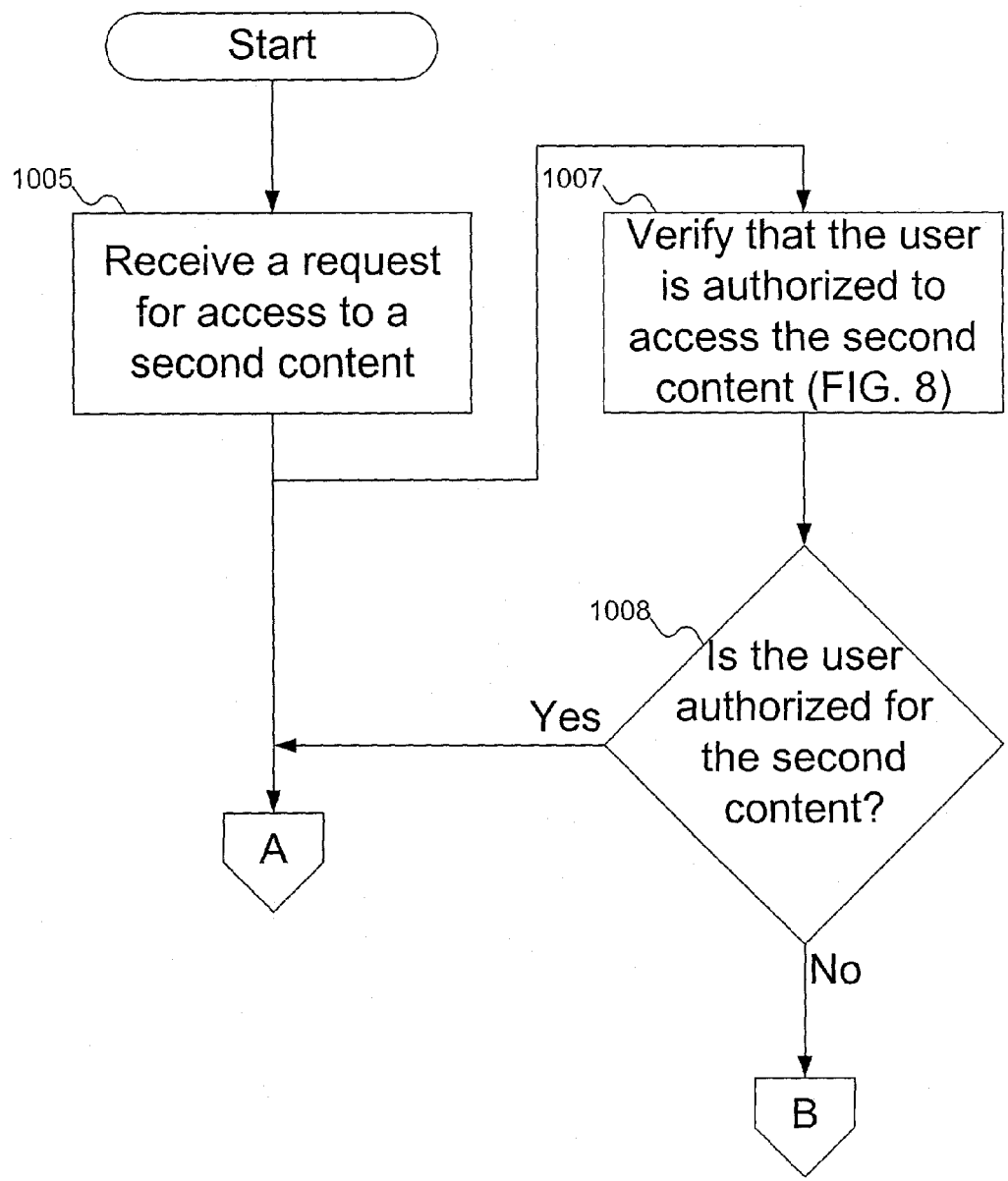
Figure 10B:
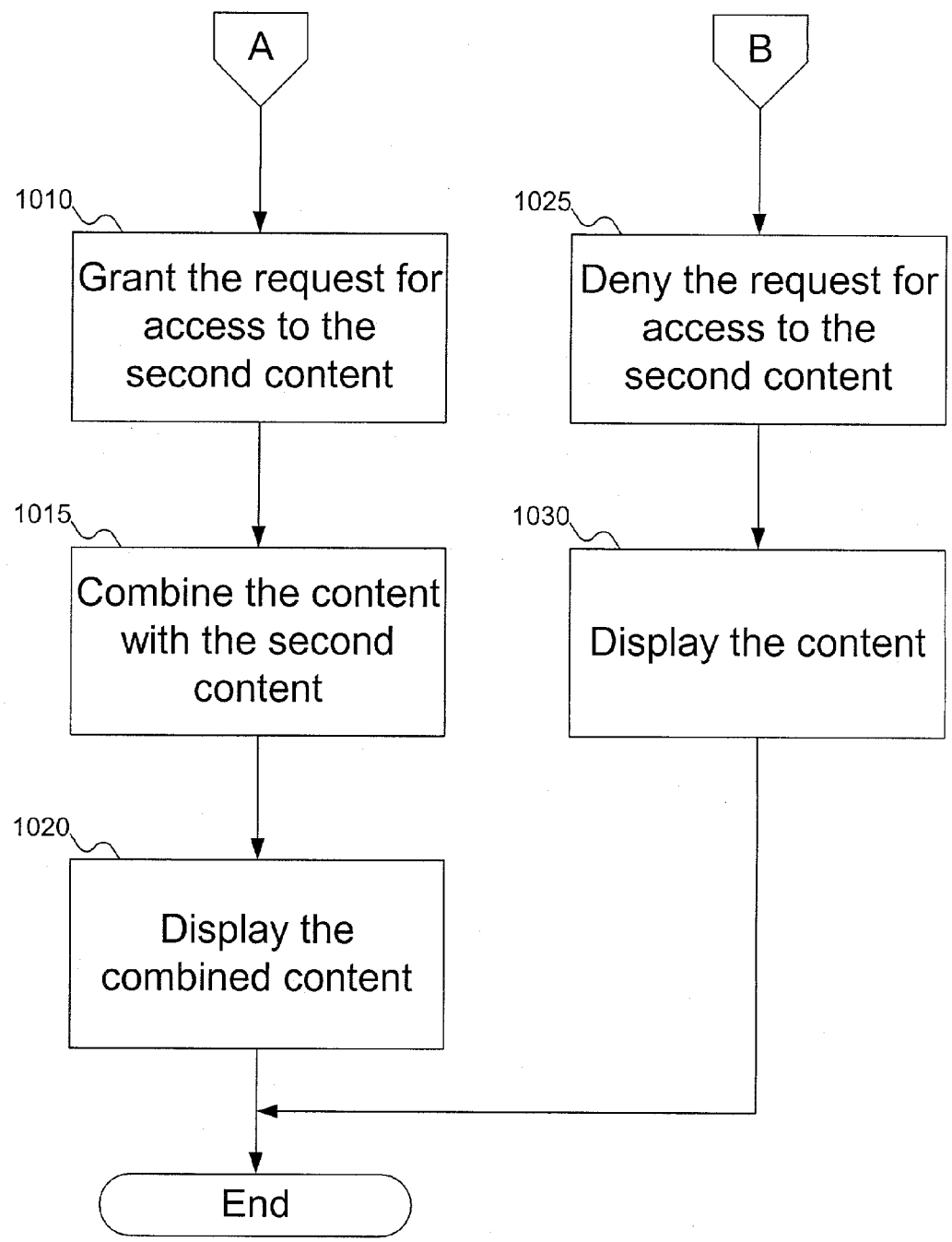

FIGS. 10A-10B show a flowchart of the procedure for combining the content with a second content from the server. In FIG. 10A, at step 1005, the server receives a request for access to another content on the server. At step 1007, the server verifies that the user is authorized for access to the other content. At step 1008, the server determines whether the user was authorized to access the content. If the user was authorized to access the second content, then at step 1010 (FIG. 10B), the server grants access to the other content. At step 1015 the two contents are combined, and at step 1020 the combined content is displayed to the user. On the other hand, if the user was not authorized to access the second content, then at step 1025 the server denies the request to access the second content, and at step 1030 the one content for which the user is authorized is displayed.

Figure 11:
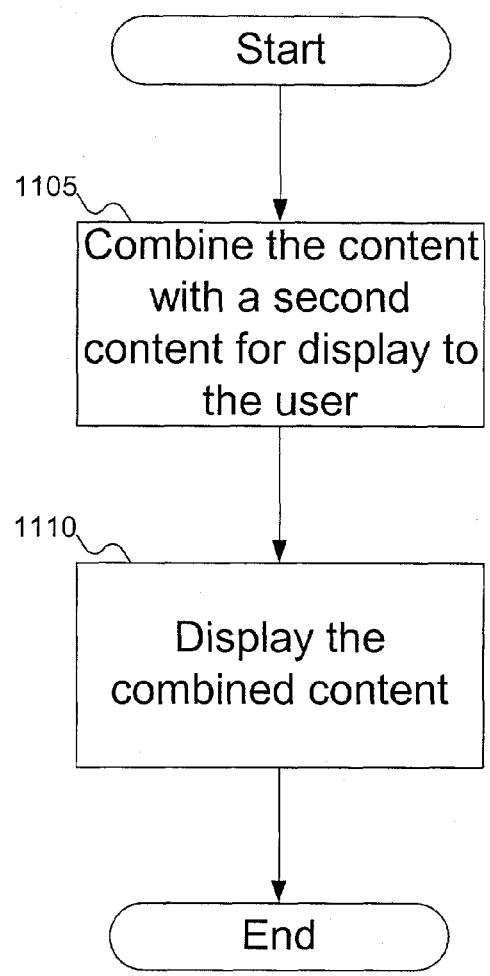

FIG. 11 shows a flowchart of the procedure for combining the content with a second content from another source. In FIG. 11, at step 1105, the content is combined with the other content, and at step 1110 the combined content is displayed to the user.

A person skilled in the art will recognize that an embodiment of the invention described above can be implemented using a computer. In that case, the method is embodied as instructions that comprise a program. The program can be stored on computer-readable media, such as floppy disks, optical disks (such as compact discs), or fixed disks (such as hard drives). The program can then be executed on a computer to implement the method.

Having illustrated and described the principles of the invention in a preferred embodiment thereof, it should be readily apparent to those skilled in the art that the invention can be modified in arrangement and detail without departing from such principles. All modifications coming within the spirit and scope of the accompanying claims are claimed.

The invention claimed is:

1. An apparatus for presenting content to a user, comprising:
    a first content;
    a first gadget to present the first content to the user;
    a second content, wherein the second content is unrelated to the first content;
    a second gadget independent of the first gadget to present the second content to the user;
    at least one server to store at least one of the first content, the second content, the first gadget, and the second gadget;
    a content page including the first gadget and the second gadget;
    a container hierarchy containing at least one container and a directory entry for the user; and
    an authorization server for verifying that the directory entry for the user authorizes the user to access the first content and the second content before permitting the user access to the content page,
    wherein each gadget includes at least one layout information file (LIF) specifying a layout for each gadget on the content page based on a combination of an identified device on which the content page is to be displayed and an identified user language in which the content gage is to be displayed and at least one layout strings file comprising strings to be displayed on each gadget, and
    wherein the first gadget includes a first LIF for use with a first combination of a device and a user language and a second LIF for use with a second combination of a device and a user language, where the first combination is different from the second combination.

2. The apparatus according to claim 1, further comprising software using the directory entry for the user in the container hierarchy to verify that the user is authorized to access the first content and the second content before permitting the user access to the content page.

3. The apparatus according to claim 2, wherein:
    the container hierarchy includes a container containing the directory entry for the user; and
    the verifying comprises determining that authorization inherited in the directory entry for the user authorizes the user to access the first content.

4. The apparatus according to claim 1, wherein the authorization server stores the container hierarchy.

5. The apparatus according to claim 1, further comprising an authentication server including means for authenticating the user.

6. The apparatus according to claim 1, further comprising means for authenticating the user.

7. The apparatus according to claim 6, wherein the means for authenticating includes software to authenticate the user.

8. The apparatus according to claim 1, further comprising a client from which the user requests access to the content page and on which the content page is displayed.

9. A method for displaying content to a user, comprising:
receiving a request for access to a first content and a second content in a portal by a user, wherein the second content is unrelated to the first content;
accessing a directory entry for the user in a container hierarchy, the container hierarchy including at least one container;
verifying that the directory entry authorizes the user as to access the first content and the second content;
granting the request for access to the first content and the second content responsive to the verifying;
assembling a content page including a first gadget to present the first content and a second gadget to present the second content; and
displaying the content page including the first gadget and the second gadget to the user if the request for access is granted, comprising:
identifying a device on which the content page is to be displayed;
identifying a user language in which the content page is to be displayed; and
selecting one of a plurality of layout information files (LIFs) for the first gadget based on a combination of the device and the user language, where each of the plurality of LIFs can be used with a different combination of a device and a user language, and
wherein each gadget includes at least one layout information file (LIF) specifying a layout for each gadget on the content page and at least one layout strings file comprising strings to be displayed on each gadget.

10. The method according to claim 9, wherein:
accessing a directory entry for the user in a container hierarchy includes:
identifying a container in a container hierarchy in which a directory entry for the user is nested; and
inheriting, at the directory entry, authorization to access the first content from the container; and
determining that the directory entry identifies the user as authorized to access the first content includes determining that inherited authorization to access the first content authorizes the user to access the first content.

11. The method according to claim 9, further comprising denying the request for access to the first content if the user is not authorized.

12. The method according to claim 9, further comprising authenticating the user.

13. The method according to claim 12, wherein authenticating the user includes:
receiving authentication information for the user; and
verifying that the authentication information is for the user.

14. The method according to claim 13, wherein receiving authentication information includes the content providing the authentication information to the portal.

15. The method according to claim 13, wherein receiving authentication information includes the portal requesting the authentication information from the user.

16. The method according to claim 9, wherein displaying the content page includes:
determining at least one preferred language for the user; and
displaying the first content and the second content in the preferred language for the user.

17. A tangible, non-transitory computer-readable storage medium storing a program that, when executed by a processor, is configured to display content to a user, the program comprising:
software to receive a request for access to a first content and a second content in a portal by a user, wherein the second content is unrelated to the first content;
software to access a directory entry for the user in a container hierarchy, the container hierarchy including at least one container;
software to verify that the directory entry authorizes the user to access the first content and the second content;
software to grant the request for access to the first content and the second content if the user is authorized;
software to assemble a content page including a first gadget to present the first content and a second gadget to present the second content; and
software to display the content page including the first gadget and the second gadget to the user if the request for access is granted, comprising:
software to identify a device on which the content page is to be displayed;
software to identify a user language in which the content page is to be displayed; and
software to select one of a plurality of layout information files (LIFs) for the first gadget based on a combination of the device and the user language, where each of the plurality of LIFs can be used with a different combination of a device and a user language, and
wherein each gadget includes at least one layout information file (LIF) specifying a layout for each gadget on the content page and at least one layout strings file comprising strings to be displayed on each gadget.

18. A tangible, non-transitory computer-readable storage medium storing a program according to claim 17, wherein:
the software to access includes:
software to identify a container in a container hierarchy in which a directory entry is nested; and
software to inherit at the directory entry, authorization to access the content from the container; and
the software to determine includes software to determine that the directory entry including inherited authorization to access the first content authorizes its entries to access the first content.

19. A tangible, non-transitory computer-readable storage medium storing a program according to claim 17, further comprising software to deny the request for access to the first content and the second content if the user is not authorized.

20. A tangible, non-transitory computer-readable storage medium storing a program according to claim 17, further comprising software to authenticate the user.

* * * * *

UNITED STATES PATENT AND TRADEMARK OFFICE
CERTIFICATE OF CORRECTION

| | | |
|---|---|---|
| PATENT NO. | : 7,890,639 B1 | Page 1 of 1 |
| APPLICATION NO. | : 10/119784 | |
| DATED | : February 15, 2011 | |
| INVENTOR(S) | : Shawn Matthew Holmstead et al. | |

It is certified that error appears in the above-identified patent and that said Letters Patent is hereby corrected as shown below:

Column 4, line 14, the words "letter 130 A" should be replaced with -- letter A --;

Column 8, line 42, the word "gage" should be replaced with -- page --.

Signed and Sealed this
Ninth Day of August, 2011

David J. Kappos
*Director of the United States Patent and Trademark Office*